United States Patent [19]
Cottrell, Jr.

[11] Patent Number: 4,600,882
[45] Date of Patent: Jul. 15, 1986

[54] SENSITIVITY RECALIBRATION SYSTEM FOR BODY SEARCH METAL DETECTORS

[76] Inventor: Walker C. Cottrell, Jr., 308 Hillwood Rd., Richmond, Va. 23226

[21] Appl. No.: 757,017

[22] Filed: Jul. 19, 1985

[51] Int. Cl.⁴ ............................................ G01R 35/00
[52] U.S. Cl. .................................................. 324/202
[58] Field of Search ............... 324/202, 228, 225, 262; 73/1 R

[56] References Cited
U.S. PATENT DOCUMENTS 2,874,349  2/1959  Staats .................................. 324/202
3,956,692  5/1976  Weinberg ............................ 324/202

FOREIGN PATENT DOCUMENTS 0739391  6/1980  U.S.S.R. ............................. 324/202

Primary Examiner—Ernest F. Karlsen
Assistant Examiner—Walter E. Snow
Attorney, Agent, or Firm—John F. C. Glenn

[57] ABSTRACT

Metal detector sensitivity is checked by holding its sensing means adjacent to a test unit containing a metal body mounted closer to one side than the other and calibrated to give a desired range of response when the sensing means moves from one of the said sides to the other.

10 Claims, 5 Drawing Figures

SENSITIVITY RECALIBRATION SYSTEM FOR BODY SEARCH METAL DETECTORS

BACKGROUND OF THE INVENTION

Hand-held electronic sensing devices are widely used to detect the presence of guns, knives, bombs and the like concealed on the persons of airport passengers and prison visitors. The level of sensitivity must be low enough to detect a relatively small but dangerous item, but not so low as to be activated by items too small to be likely to cause trouble, such as metal eyelits for shoe laces. The minimum level for giving a positive signal varies with particular applications. A prison, for example, is concerned about items as small as knives and saw blades, whereas an airport is not apt to be concerned about blades, but does need a signal for the presence of a small gun, for example.

Maintaining each sensing device at a predetermined standard level of sensitivity has presented a serious problem. The performance of a metal detector can vary significantly due to changes in ambient temperature or electromagnetic conditions, loss of battery strength, or adverse effects of shock, moisture or age on other components. The device usually has controls for adjustment to restore performance, but test runs with commonly available test objects, such as a screwdriver, lack precision, uniformity and reliability of the data obtained. Of course, the devices can be sent to a central calibration facility, but that causes delay and expense.

SUMMARY OF THE INVENTION

In accordance with the present invention, a device is provided for testing the sensitivity of a detector for discovering the presence of a concealed metal object through the level of its response to a pulsed signal from the detector. The device comprises a body of metal mounted within a case of material substantially unaffected by electromagnetic or inductive fields, in a position where the metal body is closer to one exterior side portion of the case than it is to the opposite side of the case. The case and the body of metal are preferably elongated parallel to each other, and the outside of the case is marked to show where the metal body is closest to and farthest from the outside of the case. A predetermined amount of the metal body is spaced a predetermined distance from the side of the case so that when a known form of metal detector having a desired calibration of sensitivity has its sensing means next to the side of the case where the metal body is closest, a positive signal will be given by the detector, whereas such signal will be given, if at all, in distinctly lesser degree when the sensing means is placed next to the side of the case where the metal body is farthest from the outside of the case.

Other objects, advantages and details of the invention will become apparent as the following disclosure proceeds.

BRIEF DESCRIPTION OF THE DRAWINGS

A present preferred embodiment of the invention is shown in the accompanying drawings, in which there are shown, for purposes of illustration only, the following figures.

DETAILED DESCRIPTION OF PRESENT PREFERRED EMBODIMENT OF THE INVENTION

Figure 1:
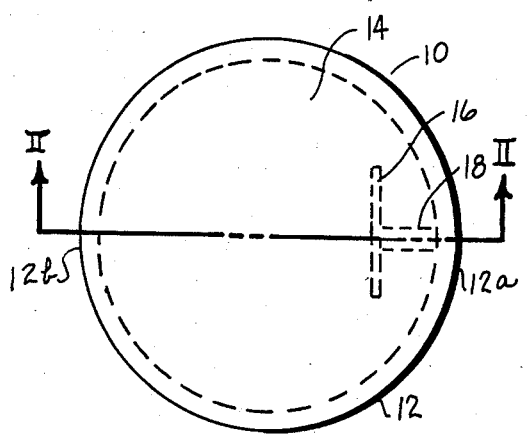
FIG. 1 shows a top end view of a testing device in accordance with the invention.
Figure 2:
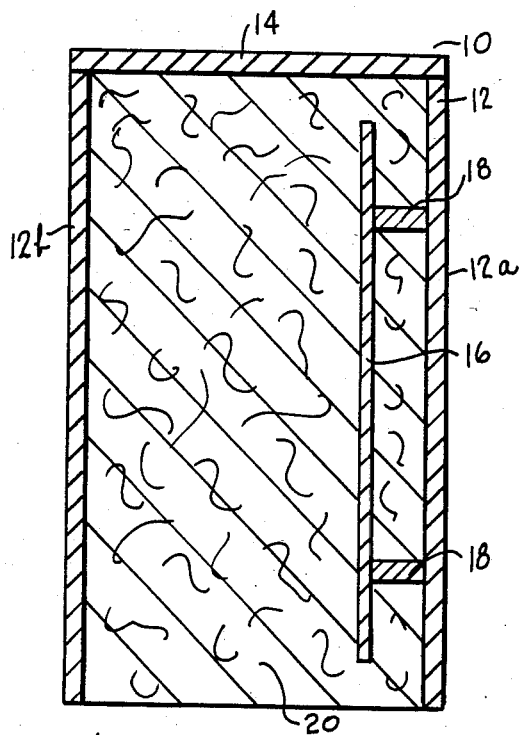
FIG. 2 shows a section on the line II—II in FIG. 1.

Referring now more particularly to the accompanying drawing, and initially to FIGS. 1 and 2, there is shown a testing unit 10 having a hollow cylindrical outer sidewall 12, and a circular top cover 14. An elongated metal body 16 is secured by a pair of posts 18 to the inside of sidewall 12.

The metal body 18 is elongated in a direction parallel to the central axis of cylindrical wall 12, and is positioned between the central axis of wall 12 and adjacent to portion 12a of wall 12, so that it is closer to the portion 12a than it is to the portion 12b of wall 12 on the opposite side of wall 12.

The metal body 18 is preferably steel or other ferrous metal, but may be any metal responsive to a high frequency electromagnetic or inductive field such as are used for metal detection. The wall 12 and cover 14 must be substantially non-responsive to said fields and are preferably of PVC or other organic polymer, although materials such as paperboard or certain glasses can be used instead. The posts 18 may be of a field responsive material, such as metal, in which case they should be considered part of the metal body 16 for purposes of the invention. If made of a non-field responsive material, the posts 18 should be considered part of the wall 12 for purposes of the invention.

Although some metal detecting units operate on an electromagnetic basis, this tends to limit their usefulness to detection of ferrous metals. Consequently, a more commonly used form of metal detectors has a coil for creating an inductive field through high frequency oscillations. When the coil is held near a body in which the field has the inductive effect of causing eddy currents in the body, there will be a resultant change of frequency (or voltage) in the coil, and when the new frequency (or voltage) is compared with the old, an audio signal is given when the amount of such change reaches a predetermined level.

When either of these forms of electronic metal detectors are used with the testing unit 10, the response will be much larger when the sensing means is placed next to exterior sidewall portion 12a than when it is placed next to exterior sidewall portion 12b and this difference in response can be used to select an amount of weight of metal object 16, and the difference in spacing of the metal body from sidewall portions 12a and 12b, to determine whether a given metal detector is still calibrated to respond at the desired level for purposes of metal detection.

Figure 3:
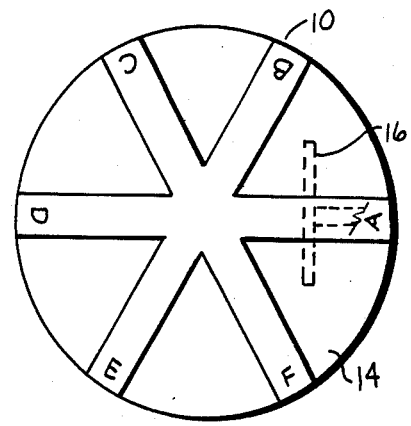
FIG. 3 corresponds to FIG. 1, but shows positional markings on the end.
Figure 4:
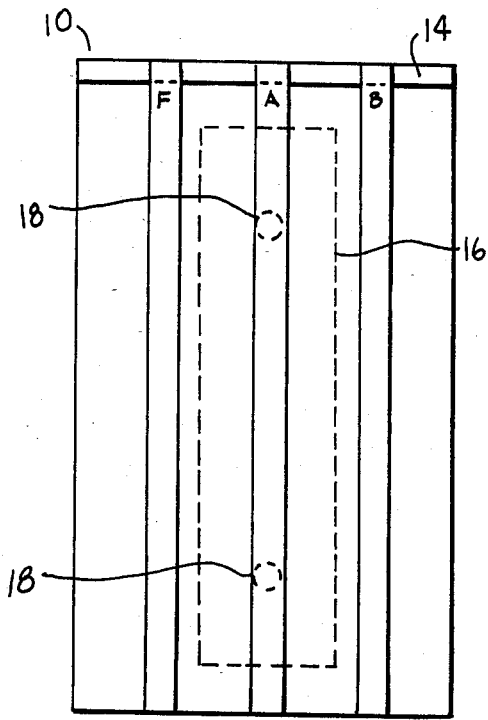
FIG. 4 is a side view from the right side of FIG. 1.
Figure 5:
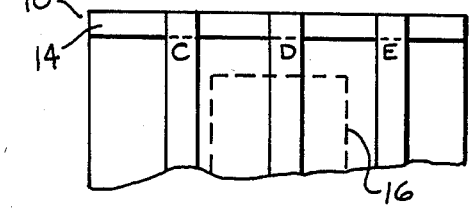
FIG. 5 is a partially broken-away side view from the left side of FIG. 1.

The hollow wall 12 is preferably filled with a foamed organic polymer 20 to keep out foreign matter and moisture while having no response to fields generated by testing instruments. This completely encloses the metal body 16 so that it is out of sight. Consequently, the outside of unit 10 is marked to indicate where metal body 16 is closest to the sidewall 14 and where it is farthest from sidewall 14. This is done, for example, by marking a stripe with a designation capital A down the exterior sidewall portion 12A (FIG. 4), and a stripe designated D down the exterior sidewall portion 12B (FIG. 5). For purposes of logging in test readings of a detector unit around the periphery of the sidewall 12, a series of stripes may be marked down the length of sidewall 12, starting with the said stripe A, then at 60° intervals, a stripe B, a stripe C, the said stripe D, a stripe E and a stripe F. Stripes across the top cover 14 may also be used, with the said designations A, B, C, D, E and F shown at the ends of these top stripes adjacent to the periphery of cover 14 (FIG. 3).

The test device of the invention may be manufactured in quantity to match any desired calibration of a standard unit of hand-held metal detector. It may then be issued to personnel using such units, for checking and adjusting the units from time to time to keep them at the desired calibration for optimum sensitivity.

Although a present preferred embodiment and practice of the invention has been illustrated and described, it will be understood that the invention is not limited thereto, but may be otherwise embodied and practiced within the scope of the following claims.

I claim:

1. A device for use with hand held electronic detector of metal of adjustable sensitivity setting to conform the setting to an estabished standard of sensitivity for body search security purposes, comprising a generally cylindrical outer case of material substantially unaffected by magnetic and inductive fields, and a body of metal elongated in a direction parallel to the cylindrical axis of the case, said body being mounted within the case in spaced relation from the cylindrical axis and exterior side surface of the case and thus uniformly closer along its length to one side of the case than to the opposite side of the case, the metal body being capable of causing a hand held electronic metal detector to generate a predetermined signal when the detector is held close to the side of the case where the metal body is closest, and of not causing such signal when the detector is held close to said opposite side of the case.

2. A device according to claim 1, including means marking where the metal body is closest to the side of the case.

3. A device according to claim 1, including means marking where the metal body is farthest from the side of the case.

4. A device according to claim 1, including means indicating where the metal body is closest to the outside of the case, and means indicating where the metal body is farthest from the outside of the case.

5. A device according to claim 1, in which the case is in the form of a straight tube, and the body of the metal is elongated parallel to the length of the tube.

6. A device according to claim 5, in which the interior of the case is closed by a filling of foamed organic polymer which entirely surrounds the metal body.

7. A device for use with a hand held electronic detector of metal by induction to conform its adjustable sensitivity setting to an established standard of sensitivity for body search security purposes, comprising a substantially non-inductively responsive elongated cylindrical case, an elongated body of inductively responsive metal mounted within the case parallel to the central axis of the case and positioned between said central axis and a portion of the outside surface of the case, said body being concealed from view within the interior of the case, and means marking the outside of the case to show where the metal body is positioned relative to the outside of the case, the metal body being capable of causing a predetermined signal to be generated by a hand held electronic metal detector held close to the side of the case where the metal body is closest, and of not causing generation of such signal when the detector is held close to said opposite side of the case.

8. A device for use with a hand held electronic metal detector of adjustable sensitivity setting to conform the setting to an established standard of sensitivity for body search security purposes, comprising a generally cylindrical case of material substantially unaffected by magnetic and inductive fields, and a body of metal entirely surrounded by the case and mounted within the case in spaced relation from and parallel to the cylindrical axis of the case and closer to one cylindrical side wall of the case than to the opposite side wall of the case, the metal body being capable of causing generation of a predetermined signal from a hand held electronic metal detector held close to the side of the case where the metal is closest, and not causing generation of such signal when the detector is held close to said opposite side of the case.

9. A method of checking on continued accuracy of a hand-held electronic pulse emitting unit for detecting on a person a concealed weapon of more than a predetermined weight of metal, based on generation of a signal by the unit caused by and varying with the strength of metal response to the pulses, comprising the steps of providing a test metal body of said weight mounted within a case having substantially no response to said pulses, both case and body being elongated in the same direction and the metal body being spaced uniformly from each of a pair of opposite sides of the case but closer to one of said sides than to the other, operating the detecting unit adjacent to one of said sides and then the other, and comparing the degree of detecting the signal of the unit in each of said operations with that of the corresponding signal when the unit was correspondingly operated while known to be calibrated to a desired standard.

10. The method of claim 9, in which the detecting unit is adjustable to change its sensitivity level, and including the step of adjusting said level to bring it closer to said predetermined sensitivity level.

* * * * *